United States Patent
Zhang

(10) Patent No.: US 11,616,766 B2
(45) Date of Patent: Mar. 28, 2023

(54) ENCRYPTION AND DECRYPTION METHOD AND SERVER OF DIGITAL CODING, AND STORAGE MEDIUM

(71) Applicant: Shanghai Hode Information Technology Co., Ltd., Shanghai (CN)

(72) Inventor: Yi Zhang, Shanghai (CN)

(73) Assignee: SHANGHAI HODE INFORMATION TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 17/315,778

(22) Filed: May 10, 2021

(65) Prior Publication Data

US 2021/0352052 A1    Nov. 11, 2021

(30) Foreign Application Priority Data

May 8, 2020    (CN) .......................... 202010382846.1

(51) Int. Cl.
*H04L 9/40* (2022.01)
(52) U.S. Cl.
CPC ................. *H04L 63/0428* (2013.01)
(58) Field of Classification Search
CPC ............................. H04L 9/06; H04L 63/0428
USPC ........................................................ 713/153
See application file for complete search history.

(56) References Cited

U.S. PATENT DOCUMENTS

| | | | | |
|---|---|---|---|---|
| 7,203,844 B1* | 4/2007 | Oxford | ............... | H04L 63/0478 |
| | | | | 713/193 |
| 7,953,222 B2* | 5/2011 | Yang | ........................ | H04L 9/00 |
| | | | | 380/28 |
| 9,886,597 B2* | 2/2018 | Bringer | ................... | H03M 7/20 |
| 10,050,956 B2* | 8/2018 | Yu | .......................... | H04W 12/06 |
| 10,567,352 B2* | 2/2020 | Gareau | ................ | H04L 1/0002 |
| 2008/0270792 A1* | 10/2008 | Liu | ........................ | H04L 9/3226 |
| | | | | 713/165 |
| 2015/0163060 A1* | 6/2015 | Tomlinson | .............. | H04L 9/304 |
| | | | | 380/30 |

FOREIGN PATENT DOCUMENTS

| | | |
|---|---|---|
| CN | 107196840 A | 9/2017 |
| CN | 110768785 A | 2/2020 |

* cited by examiner

*Primary Examiner* — Amare F Tabor
(74) *Attorney, Agent, or Firm* — BakerHostetler

(57) ABSTRACT

The present disclosure describes techniques of encryption and decryption. The described techniques comprise obtaining a digital code to be encrypted; obtaining at least one predetermined rule; generating an encrypted digital code by rearranging and reorganizing bits comprised in the digital code to be encrypted based on the at least one predetermined rule; and delivering the encrypted digital code to a client computing device.

15 Claims, 3 Drawing Sheets

ENCRYPTION AND DECRYPTION METHOD AND SERVER OF DIGITAL CODING, AND STORAGE MEDIUM

CROSS-REFERENCE TO RELATED APPLICATION

The present invention claims priority of Chinese Patent Application No. 202010382846.1, filed on May 8, 2020, entitled "encryption and decryption method and server of digital coding, and storage medium". The entire content of the above-identified application is incorporated in the present invention by reference.

BACKGROUND

With the rapid development of the Internet, a large amount of data is transmitted between a server computing device and a client computing device, and the security of the data is very important. For example, in daily applications, front and back ends often use a unique ID identification as communication parameter, such as an identity ID of a game player, a product ID of an online mall, and so on. If these real IDs of a server are exposed, a client can send a large number of simulation requests to the server to attack the server, which may cause the server to crash. From the user's point of view, the exposure of its real ID will also cause information leakage. Therefore, for security reasons, the real IDs of these servers usually need to be encrypted.

SUMMARY

Currently, as a commonly used encryption and decryption method, including the following steps: a server saves a corresponding relationship between IDs transmitted to the client and real IDs in the memory, and then the server searches for a corresponding real ID after receiving a request. However, in reality, there are many encrypted contents, which obviously reduces the efficiency of data processing. Moreover, since the correspondence is in a memory of a physical machine, the data and process of encryption and decryption must be on the same physical machine. However, the current common servers on the market have a plurality of processing requests, and the encryption and decryption method obviously does not meet the current market demand. In addition, as for the current encryption methods such as DES (Data Encryption Standard) and RSA (RSA algorithm), due to the frequent encryption operation in practice, it usually causes excessive CPU consumption and affects throughput of the server, thus affecting the overall service performance. For example, "A" is encrypted to "ed311" by a general encryption method, which significantly increases the character length, not only increases the memory consumption, but also increases the CPU consumption in the process of data processing, and increases the bandwidth consumption in the process of data transmission.

In order to solve the above-mentioned problems, one aspect of the present invention provides an encryption and decryption method of digital coding, including: obtaining a digital code to be encrypted; obtaining a preset code shift strategy, and arranging and reorganizing the digital code to be encrypted according to the code shift strategy to generate an encrypted digital code; delivering the encrypted digital code to a client.

The present invention further provides a server, the server implements the following steps: obtaining a digital code to be encrypted; obtaining a preset code shift strategy, and arranging and reorganizing the digital code to be encrypted according to the code shift strategy to generate an encrypted digital code; delivering the encrypted digital code to a client.

The present invention further provides a computer storage medium, which stores a computer program, and when the computer program is executed by a processor, the method according to any one of the above is implemented.

According to the above content, the encryption and decryption method of digital encoding of the present invention includes: obtaining a digital code to be encrypted; obtaining a preset code shift strategy, and arranging and reorganizing the digital code to be encrypted according to the code shift strategy to generate an encrypted digital code; delivering the encrypted digital code to a client. The present invention arranges and reorganizes the digital code to be encrypted, which can avoid adding extra bytes, and can improve the overall service performance when the encryption and decryption operations are frequently performed, that is, when the server throughput is large, and encryption shift operation is reversible, which can simplify the decryption operation. Moreover, the encryption and decryption operations in the process are only solved by the server, and have no substantial impact on the client. Even if the server changes strategy rules of the encryption and decryption, the client does not need to make corresponding adjustments, which is convenient for the later upgrade of the encryption and decryption scheme, and can reduce great trouble for the network server.

DETAILED DESCRIPTION OF ILLUSTRATIVE EMBODIMENTS

Figure 1:
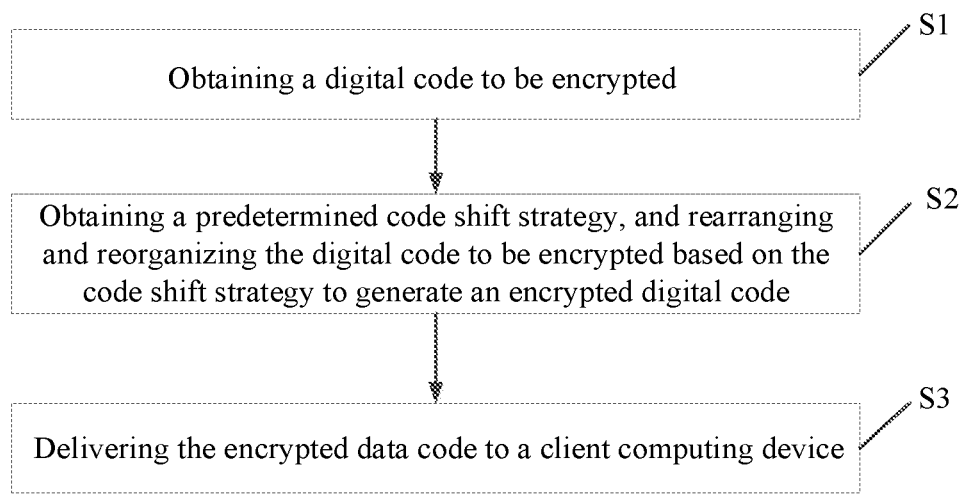
FIG. 1 is a flowchart of an encryption and decryption method of digital coding according to an embodiment of the present invention.

Regarding security of data transmitted between a server and a client, for example, when users play games on mobile phones, identity IDs are used. For example, these identity IDs are self-increasing numbers in a database, such as generated in increments of 1, 2, and 3. If original data of the identity IDs in the communication, for example, 1 is directly sent to the client, then the user knows that the original data of his identity ID is 1, and ID data of subsequent users may be guessed. Then some simulation behaviors can be done through interface in the system. For example, user information can be queried as long as ID data is entered, which is very dangerous. On the one hand, it causes the leakage of user information; on the other hand, the client can send a large number of simulation requests to the server to attack the server. Therefore, these IDs need to be encrypted before transmission.

However, as mentioned above, for example, an "A" is encrypted into "ed311" through a general encryption method, which obviously increases the character length, not only increases memory consumption, but also increases CPU consumption during data processing, and increases bandwidth consumption during data transmission. However, the encryption and decryption method of digital encoding provided by an embodiment of the present invention does not increase the character length. For example, when a user registers an account, the server generates an ID according to a preset rule. The preset rule may be an increment rule or a decrement rule, etc., which can be preset by humans. Assuming that the generated user's real ID is ten digits, such as 1000000000, whose code is 32-bit binary. If the server passes it to the client without encryption, then the client will display "1000000000" according to 32-bit binary analysis, thus the user's real ID is exposed; if the server uses the encryption and decryption method of digital coding provided by an embodiment of the present invention to generate an encrypted binary code, and then transmits the encrypted binary code to the client, although the 32-bit binary is still transmitted to the client, and the client still follows the original parsing, the parsed result may be 02113000000.

Through the above method, not only the normal transmission and processing of data is realized, but also the user's real ID is kept confidential by the server. In particular, in the above process, the user's real ID is 32-bit binary, and the binary code generated after encryption is still 32-bit, that is, the content delivered to the client will not add extra bytes due to the encryption process. Then for a 32-bit binary memory, a 32-bit binary memory can be created for operation, which neither increases memory consumption nor CPU consumption. Moreover, since both before and after encryption are 32-bit binary code, there will be no additional bandwidth consumption during data transmission.

In the encryption and decryption process of the digital coding in an embodiment of the present invention, the server encrypts sensitive information to generate a ciphertext, and then sends the ciphertext to the client, for example, the ciphertext is the encrypted user ID or product ID. When the object that the client needs to operate is the user ID or product ID, that is, when the client sends the user ID or product ID to the server, the server performs the decryption step. In the whole process, the user does not know what is the real user ID or product ID, and the purpose of confidentiality can be achieved. In particular, the encryption and decryption operations of the process are only solved by the server and have no substantial impact on the client. Even if the server changes encryption and decryption strategy rules, the client does not need to make corresponding adjustments, which is convenient for upgrading the encryption and decryption scheme in the future, and can reduce a lot of trouble for the network server.

To make the objectives, technical solutions and advantages of the present invention more comprehensible, embodiments of the present application is described in further detail below in combination with the drawings. Please refer to FIG. 1, which is a schematic flowchart of a encryption and decryption method of digital encoding according to an embodiment of the present invention, including the following steps:

S1: obtaining a digital code to be encrypted;

S2: obtaining a preset code shift strategy, and arranging and reorganizing the digital code to be encrypted according to the code shift strategy to generate an encrypted digital code;

S3: delivering the encrypted digital code to a client.

According to the above content, compared with the original data, the result after shift confusion has the same byte occupation, which will not increase the traffic consumption in the process of data transmission due to data encryption.

Figure 2:
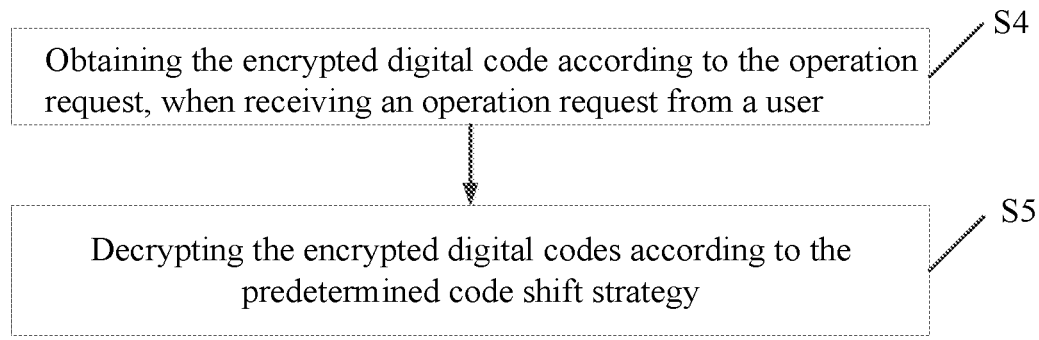
FIG. 2 is a flowchart of steps further included in the encryption and decryption method of digital coding in an embodiment of the present invention.

Optionally, as shown in FIG. 2, the encryption and decryption method of digital encoding further includes:

S4: obtaining the encrypted digital code according to the operation request, when receiving an operation request from the client;

S5: decrypting the encrypted digital codes according to the code shift strategy to obtain the digital code to be encrypted.

Wherein, the shift operation corresponding to the encode shift strategy in the decryption process is a reverse operation of the shift operation corresponding to the encode shift strategy in the encryption process, which can greatly simplify the decryption steps and improve the stability of the server as a whole.

In addition, the digital code to be encrypted can be pre-input by the technician to the server, and the server converts the ID into the digital code to be encrypted. For example, the technician can input the ID of a virtual product to the server in advance so that the server can convert the ID of the virtual product into the digital code to be encrypted. For the user ID, for example, when the user registers an account, the server generates a new real identity ID, the new real identity ID is used as a digit to be encrypted, and the binary code converted from the new real identity ID is the digital code to be encrypted. The server encrypts the digital code to be encrypted to generate an encrypted digital code, and then sends the encrypted digital code to the client, and the client analyzes the encrypted digital code and displays it. When the client receives a user operation, it sends the encrypted digital code to the server, and the server performs decryption steps on the encrypted digital code to obtain the digital code to be encrypted. Therefore, the digital code to be encrypted described in step 1 may be obtained by conversion of the identity ID newly generated by the server, or may be obtained through decryption steps. For example, when a user registers an account, the server generates a new identity ID, the new identity ID is converted into a binary code to be encrypted as 001100, and the encrypted binary code generated by encryption is 110000, that is, the digital code to be encrypted at this time is converted from the identity ID newly generated by the server. When the server performs the decryption step and decrypts the encrypted binary code 110000 into the original binary code 001100 to be encrypted, the server then performs the encryption step, thus the digital code to be encrypted in the step S1 is obtained through the decryption step.

The above process involves converting digitals to be encrypted into digital codes to be encrypted, for example, there are two encoded methods, BigEndian and LittleEndian on the market. For example, for "10321", the result obtained by BigEndian encoding is 011144111, and then the obtained digital code is encrypted, for example, the generated encrypted code is 441110111, and then it is transmitted to the client, but the specific process is not displayed on the client.

Optionally, the digital code to be encrypted is generated by encoding a user ID or generated by encoding a product ID, which can improve the security of most data. When the server generates an ID, the server encrypts the ID and sends the encrypted ID to the client, so as to achieve the purpose of keeping the real ID confidential. For example, CD01 may be obtained by encrypting AAAA, and the user may see CD01 through the client but not AAAA. When the client sends an encrypted ID to the server based on a user operation, the server performs a decryption operation. It should be noted that when the user operates the client, if the client does not send the ID to the server, the server does not perform the decryption step. For example, if the user modifies basic information and the modified content is only saved locally, then the client does not need to transmit the ID to the server at this time, and the server naturally does not need to perform the decryption step. For another example, the server encrypts a game equipment ID and sends the encrypted game equipment ID to the client and the client displays the encrypted ID data after parsing. When the user chooses to purchase a certain game equipment on the client, the client needs to send the encrypted ID to the server, and the server performs the decryption step to determine which game equipment the user wants to buy. In daily applications, when a user is shopping online in a mall, the goods here are equivalent to the above-mentioned game equipment, and they have the real ID and the encrypted ID correspondingly, and the encryption and decryption processes are the same, which are not repeated here. Optionally, in step 2, the arranging and reorganizing the digital codes to be encrypted according to the code shift strategy to generate encrypted digital codes, specifically includes: creating a new byte with the same number of bits according to the digital code to be encrypted; disassembling the digital code to be encrypted into several segments, and filling the several segments of the digital code to be encrypted into the byte correspondingly according to the code shift strategy to obtain the encrypted digital code. The process does not generate extra bytes, and does not increase CPU consumption, thereby ensuring data processing performance. For example, in the encryption and decryption method of digital coding in the embodiment, a new 32-bit byte with the same number of bits is created, and all bits are 0; after the digital code to be encrypted is obtained, it needs to be disassembled into several segments, then, according to corresponding code shift strategy, the segments of the digital code to be encrypted are filled into empty bytes correspondingly to obtain the encrypted digital code. The process can reorder the digital code to be encrypted only through the shift confusion operation to achieve the purpose of keeping the encrypted digital code confidential, and the obtained encrypted digital code is still 32-bit bytes, that is, no extra bytes are generated. Here, the number of segments disassembled by the encrypted digital code is at least two segments, and the specific number of segments is not limited. For example, if the original sequence after disassembly is 111 and 000, there is only one shift transformation method, that is, after the encryption shift operation is performed, it becomes 000 and 111. If it is disassembled into three, four, or five segments, there are more shift transformation methods. Therefore, the more the number of segments to be disassembled, the more the possibility of shift operation, and the higher the difficulty of the corresponding cracking.

Optionally, the obtaining a preset code shift strategy in the step 2 specifically includes: obtaining an M-bit code of the digital code to be encrypted in a preset bit segment; wherein M is a natural number greater than 1; obtaining the code shift strategy corresponding to the M-bit code. The coded numbers can be flexibly recombined and sorted, and the number of shift rules can be increased, and the complexity of coding combination sorting can be enhanced, thereby increasing the difficulty of cracking encrypted digital codes.

Optionally, the preset bit segment is located at the end of the digital code to be encrypted, which is conducive to quickly obtaining the regular bit value in the decryption process and improving the decryption efficiency.

An embodiment of the present invention also provides a server, which executes the following steps: obtaining a digital code to be encrypted; obtaining a preset code shift strategy, and arranging and reorganizing the digital code to be encrypted according to the code shift strategy to generate an encrypted digital code; delivering the encrypted digital code to a client.

An embodiment of the present invention also provides a computer storage medium, which stores a computer program, and when the computer program is executed by a processor, the method according to any one of the above is implemented.

The above-mentioned digital code may be a binary code. Since only logic 0 and logic 1 exist in the computer, directly shifting the binary code can make the encryption and decryption process more convenient and efficient.

In order to understand the technical content of the invention more clearly, the following embodiments are described in detail.

The following, as an embodiment of the present application, a specific form of encryption and decryption process is disclosed.

First, here is a detailed description of the M-bit encoding of the preset bit segment: the preset bit segment can be the tail number of the digital code to be encrypted, or the middle digital or the head digital of the digital code to be encrypted. However, because the high bit of the binary code usually comes first, for the binary code with very small value, the middle or head digital is always 0, the corresponding shift rule is relatively simple and easy to be cracked. The digital to be encrypted is, for example, 000011, 000010 or 001100, if its 2 digitals in the header are the preset bit segment, that is, the shift rule bit, then headers of the three digitals to be encrypted are all 00, which correspond to the shift rule numbered 0. However, if the same type of encryption is used all the time, it is easy to be cracked; if its trailing 2 digitals are the preset bit segment, that is, the shift rule bit, then there are binary 11, 10, 00, corresponding to the shift rule of number 3, 2, 0, which can significantly increase the difficulty of cracking encrypted digital coding.

For M-bit encoding, the larger the value of M, the higher the corresponding encryption security. For example, if the value of M is 1, that is, the shift rule bit is a binary number, and the binary number may be 0 or 1, corresponding to two shift rules; If the value of M is 2, the value of the shift rule is two binary numbers, which may be 00, 01, 10, 11, corresponding to four shift rules; if the value of M is 3, the three bit binary of the shift rule value may have the second power of 3, that is, 8 kinds of values. Wherein, the three-digit binary maximum value of 111 corresponds to the decimal number 7, so for the shift rule of the shift rule numbered 0-7, there are 8 kinds of encryption shift operations, which greatly increases the difficulty of cracking.

Therefore, for the above-mentioned preset encoding shift strategy, for example, a shift rule set is set, wherein number of shift rules contained should be the nth power of 2, and the n is greater than 0. Here, the value of n is 2, that is, the number of shift rules is 4. The operation steps for setting each shift rule and the number of the mark are shown in Table 1:

TABLE 1

Operation step and mark number of each shift rule

| mark number of shift rule | operation steps of shift rule |
|---|---|
| 0 | Put the 2nd to 8th bits of the original number to the 4th to |

TABLE 1-continued

Operation step and mark number of each shift rule

| mark number of shift rule | operation steps of shift rule |
|---|---|
| | 10th bits of the new number<br>Put the 9th to 16th bits of the original number to the 17th to 24th bits of the new number<br>Put the 17th to 24th bits of the original number to the 25th to 32nd bits of the new number<br>Put the 25th to 30th bits of the original number to the 11th to 16th bits of the new number |
| 1 | Put the 2nd to 8th bits of the original number to the 4th to 10th bits of the new number<br>Put the 9th to 16th bits of the original number to the 25th to 32nd bits of the new number<br>Put the 17th to 24th bits of the original number to the 17th to 24th bits of the new number<br>Put the 25th to 30th bits of the original number to the 11th to 16th bits of the new number |
| 2 | Put the 2nd to 8th bits of the original number to the 4th to 10th bits of the new number<br>Put the 9th to 16th bits of the original number to the 11th to 18th bits of the new number<br>Put the 17th to 24th bits of the original number to the 19th to 26th bits of the new number<br>Put the 25th to 30th bits of the original number to the 27th to 32nd bits of the new number |
| 3 | Put the 2nd to 8th bits of the original number to the 26th to 32nd bits of the new number<br>Put the 9th to 16th bits of the original number to the 18th to 25th bits of the new number<br>Put the 17th to 24th bits of the original number to the 10th to 17th bits of the new number<br>Put the 25th to 30th bits of the original number to the 4th to 9th bits of the new number |

For example, original data of an identity ID of a game user is 310. Here, the encryption processing step is performed, and the details are as follows.

Figure 3:
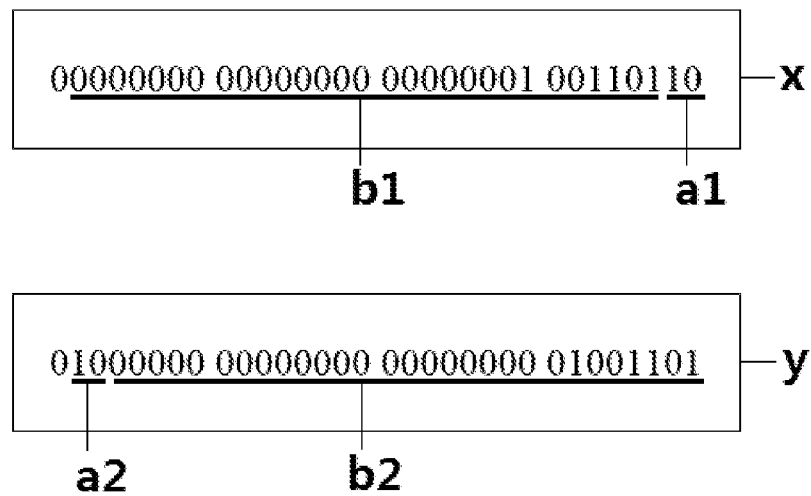
FIG. 3 is a schematic diagram of binary coding before encryption and binary coding after encryption in an embodiment of the present invention.

Please refer to FIG. 3, according to the logic 0 and logic 1 of the computer, the original data 310 is coded in the binary code x with high bit first as:

00000000 00000000 00000001 00110110,

For example, values at the two positions (a1) at the end of the binary code x are specified as the M-bit code of the preset bit segment (hereinafter referred to as the rule bit value); the regular bit value is obtained as 10; according to decimal data 2 of the rule bit value 10, the shift rule numbered 2 is correspondingly obtained from the above shift rule set, i.e. Table 1; in the above binary code x, the value of b1 area is encrypted and shifted according to the shift rule numbered 2. Wherein, the regular bit value 10 may not move at the tail a1, or it may move to other specified positions. Here, the regular bit value 10 is moved to a specified position a2 (header) of a new binary code y.

According to the above content, the encrypted binary code y is:

01000000 00000000 00000000 01001101,

Wherein, the value of b2 area is obtained by shifting the value of b1 area. The encrypted binary code is sent to the client, or the encrypted binary code is converted to a decimal value as 1073741901 and the decimal value is sent to the client.

After the client receives the encrypted identity ID data, when the user generates an operation request, the encrypted identity ID data is sent to the server by the client. At this time, the server performs the decryption step. It should be noted that if the data transmitted by the server and the client is decimal, octal or hexadecimal data or letter data, etc., it can be optionally converted to binary before encryption and decryption. For computers with only the logic 0 and 1, it can achieve the effect of efficient encryption and decryption. In addition, based on the purport of the present invention, arbitrary random codes can be shifted, so that the original data can not be exposed, so as to achieve the purpose of encryption without adding new bytes.

Based on the above content, when the server executes the decryption step, the rule bit value 10 at the specified position a2 of the encrypted binary code y is obtained, and the corresponding shift rule number is 2. Then, the server executes to move the rule bit value 10 from the a2 to the a1. Moreover, the decryption shift operation is performed on the value of the b2 area, and the decryption shift operation is a reverse operation of the encryption shift operation using the No. 2 shift rule, and no extra bytes are added in the process. Moreover, the encrypted binary code can be quickly restored to the original binary code before encryption, which can improve the overall service performance when the encryption and decryption operations are frequently performed, that is, when the server throughput is large.

It should be noted here that in the encryption process, the position of the value of the shift rule after moving is not limited to a2, and can be the header or any position in the middle of the encrypted binary code y. During the decryption process, the server can accurately obtain the value of this position.

Figure 4:
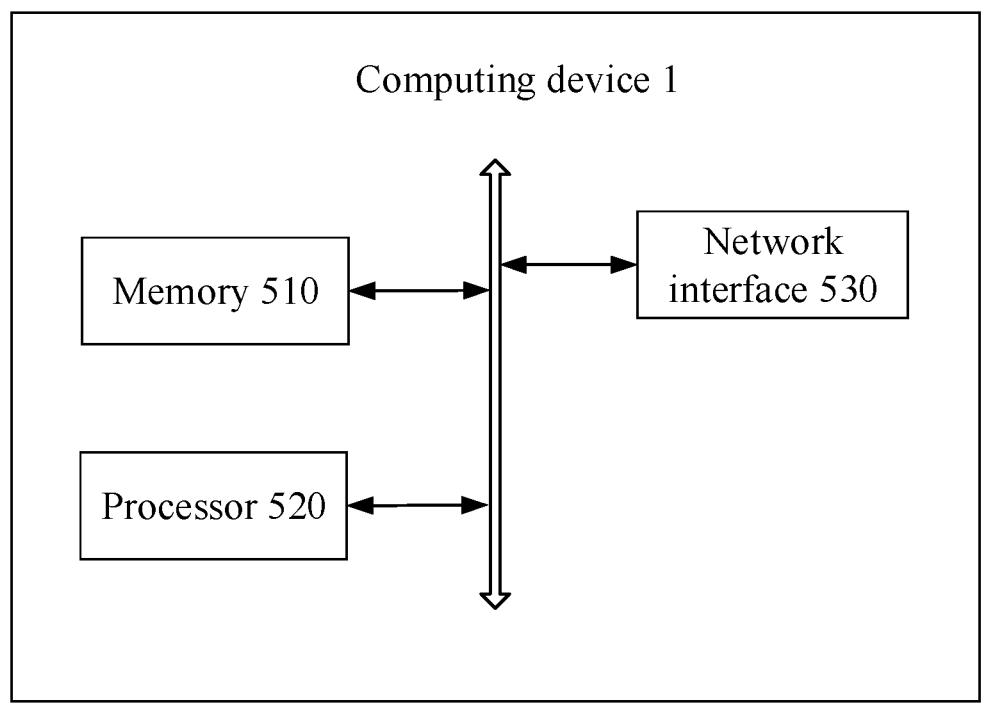
FIG. 4 is a schematic diagram of an optional hardware architecture of a computing device of the present application.

FIG. 4 schematically shows a schematic diagram of the hardware architecture of the computing device 1 suitable for implementing the method of displaying multi-screen interactive according to a third embodiment of the present application. In the embodiment, the computing device 1 is a device capable of automatically performing numerical calculations and/or information processing according to pre-defined or stored instructions. For example, can be a Smartphone, a tablet, a laptop, a desktop computer, a rack server, a blade server, a tower server, or a cabinet server (including stand-alone servers, or a cluster of a plurality of servers), and so on. As shown in FIG. 4, the computing device 1 includes at least, but is not limited to, a memory 510, a processor 520, and a network interface 530 that can be communicated with each other through a system bus. Wherein:

The memory 510 includes at least one type of computer-readable storage medium. The readable storage medium includes a flash memory, a hard disk, a multimedia card, a card type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, etc. In some embodiments, the memory 510 may be an internal storage module of the computing device 500 such as a hard disk or a memory of the computing device 1. In other embodiments, the memory 510 may also be an external storage device of the computing device 1, such as a plugged hard disk provided on the computing device 1, a Smart Media Card (SMC), a Secure Digital (SD) card, a flash memory card, and the like. Of course, the memory 510 may also include both the internal storage module and the external storage device of the computing device 1. In the embodiment, the memory 510 is generally used to store an operating system and various types of application software installed in the computing device 1 such as program codes of method of displaying multi-screen interactive and the like. In addition, the memory 510 may also be used to temporarily store various types of data that have been or will be outputted.

The processor 520, in some embodiments, may be a Central Processing Unit (CPU), a controller, a microprocessor, or other data processing chip. The processor 520 is generally used to control the overall operation of the computing device 1 such as performing control and processing related to data interaction or communication with the computing device 1. In the embodiment, the processor 520 is used to run program codes or process data stored in the memory 510.

The network interface 530 may include a wireless network interface or a wired network interface which is generally used to establish a communication connection between the computing device 1 and other computing devices. For example, the network interface 530 is used for connecting the computing device 1 to an external terminal via a network and establishing a data transmission channel and a communication connection between the computing device 1 and the external terminal. The network can be a wireless or wired network such as an enterprise Intranet, an Internet, a Global System of Mobile communication (GSM), a Wideband Code Division Multiple Access (WCDMA), a 4G network, a 5G network, a Bluetooth, Wi-Fi, and the like.

It is to be noted that FIG. 4 shows only a computing device 1 having components 510-530, but it should be understood that it is not required to implement all of the shown components and that more or fewer parts can be implemented in lieu thereof.

In the embodiment, the program codes of the method of displaying multi-screen interactive stored in the memory 510 also may be divided into one or more program modules and executed by one or more processors (the processor 510 in the embodiment) to implement techniques described in the present disclosure. In the specification, the present invention has been described with reference to its specific embodiments. However, it is obvious that various modifications and changes can still be made without departing from the spirit and scope of the present invention. Therefore, the description and drawings should be regarded as illustrative rather than restrictive.

What is claimed is:

1. An encryption and decryption method, comprising:
    obtaining a digital code to be encrypted;
    obtaining at least one predetermined rule;
    generating an encrypted digital code by rearranging and reorganizing bits comprised in the digital code to be encrypted based on the at least one predetermined rule, wherein the generating an encrypted digital code by rearranging and reorganizing bits comprised in the digital code to be encrypted based on the at least one the predetermined rule further comprises:
        creating an empty code array with a same number of bits as the digital code to be encrypted,
        disassembling the digital code to be encrypted into at least two segments, and
        filling the at least two segments of the digital code to be encrypted into the empty code array based on the at least one predetermined rule to obtain the encrypted digital code; and
    delivering the encrypted digital code to a client computing device.

2. The method of claim 1, further comprising:
    receiving the encrypted digital code from the client computing device in response to the client computing device receiving user input; and
    decrypting the encrypted digital code based on the at least one predetermined rule.

3. The method of claim 1, wherein the digital code to be encrypted is associated with a user identifier or a product identifier.

4. The method of claim 1, further comprising:
    obtaining a predetermined segment of the digital code to be encrypted, wherein the predetermined segment comprises M bits, and M is a natural number greater than 1; and
    obtaining the at least one predetermined rule based on the M bits comprised in the predetermined segment.

5. The method of claim 4, wherein the predetermined segment is located at an end of the digital code to be encrypted.

6. A system, comprising:
    at least one processor; and
    at least one memory communicatively coupled to the at least one processor and storing instructions that upon execution by the at least one processor cause the system to perform operations comprising:
        obtaining a digital code to be encrypted;
        obtaining at least one predetermined rule;
        generating an encrypted digital code by rearranging and reorganizing bits comprised in the digital code to be encrypted based on the at least one predetermined rule, wherein the generating an encrypted digital code by rearranging and reorganizing bits comprised in the digital code to be encrypted based on the at least one the predetermined rule further comprises:
            creating an empty code array with a same number of bits as the digital code to be encrypted,
            disassembling the digital code to be encrypted into at least two segments, and
            filling the at least two segments of the digital code to be encrypted into the empty code array based on the at least one predetermined rule to obtain the encrypted digital code; and
        delivering the encrypted digital code to a client computing device.

7. The system of claim 6, the operations further comprising:
    receiving the encrypted digital code from the client computing device in response to the client computing device receiving user input; and
    decrypting the encrypted digital code based on the at least one predetermined rule.

8. The system of claim 6, wherein the digital code to be encrypted is associated with a user identifier or a product identifier.

9. The system of claim 6, the operations further comprising:
    obtaining a predetermined segment of the digital code to be encrypted, wherein the predetermined segment comprises M bits, and M is a natural number greater than 1; and
    obtaining the at least one predetermined rule based on the M bits comprised in the predetermined segment.

10. The system of claim 9, wherein the predetermined segment is located at an end of the digital code to be encrypted.

11. A non-transitory computer-readable storage medium, storing computer-readable instructions that upon execution by a processor cause the processor to implement operations comprising:
    obtaining a digital code to be encrypted;
    obtaining at least one predetermined rule;
    generating an encrypted digital code by rearranging and reorganizing bits comprised in the digital code to be encrypted based on the at least one predetermined rule, wherein the generating an encrypted digital code by rearranging and reorganizing bits comprised in the digital code to be encrypted based on the at least one the predetermined rule further comprises:
    creating an empty code array with a same number of bits as the digital code to be encrypted,
    disassembling the digital code to be encrypted into at least two segments, and
    filling the at least two segments of the digital code to be encrypted into the empty code array based on the at least one predetermined rule to obtain the encrypted digital code; and
delivering the encrypted digital code to a client computing device.

12. The non-transitory computer-readable storage medium of claim 11, the operations further comprising:
    receiving the encrypted digital code from the client computing device in response to the client computing device receiving user input; and
    decrypting the encrypted digital code based on the at least one predetermined rule.

13. The non-transitory computer-readable storage medium of claim 11, wherein the digital code to be encrypted is associated with a user identifier or a product identifier.

14. The non-transitory computer-readable storage medium of claim 11, the operations further comprising:
    obtaining a predetermined segment of the digital code to be encrypted, wherein the predetermined segment comprises M bits, and M is a natural number greater than 1; and
    obtaining the at least one predetermined rule based on the M bits comprised in the predetermined segment.

15. The non-transitory computer-readable storage medium of claim 14, wherein the predetermined segment is located at an end of the digital code to be encrypted.

* * * * *